United States Patent
Dutton et al.

(10) Patent No.: US 8,566,626 B2
(45) Date of Patent: Oct. 22, 2013

(54) METHOD FOR PROCESSING A REQUEST BY SELECTING AN APPROPRIATE COMPUTER NODE IN A PLURALITY OF COMPUTER NODES IN A STORAGE CLUSTER BASED ON THE LEAST SUBMITTED BID VALUE

(75) Inventors: James E. Dutton, Spicewood, TX (US); Laura Arbilla, Austin, TX (US); David Yoakley, Austin, TX (US)

(73) Assignee: Caringo, Inc., Austin, TX (US)

( * ) Notice: Subject to any disclaimer, the term of this patent is extended or adjusted under 35 U.S.C. 154(b) by 6 days.

(21) Appl. No.: 13/527,430

(22) Filed: Jun. 19, 2012

(65) Prior Publication Data

US 2012/0278549 A1 Nov. 1, 2012

Related U.S. Application Data

(62) Division of application No. 12/839,071, filed on Jul. 19, 2010.

(60) Provisional application No. 61/226,774, filed on Jul. 20, 2009.

(51) Int. Cl.
*G06F 1/26* (2006.01)
*G06F 1/32* (2006.01)

(52) U.S. Cl.
USPC .......................................... 713/320; 711/112

(58) Field of Classification Search
USPC .......................................... 713/320; 711/112
See application file for complete search history.

(56) References Cited

U.S. PATENT DOCUMENTS

| 6,230,196 | B1 * | 5/2001 | Guenthner et al. | 709/223 |
| 6,988,272 | B1 * | 1/2006 | Iwao et al. | 719/316 |
| 2003/0079151 | A1 | 4/2003 | Bohrer et al. | |
| 2007/0079063 | A1 * | 4/2007 | Mizuno | 711/112 |
| 2007/0245165 | A1 * | 10/2007 | Fung | 713/320 |
| 2009/0073481 | A1 | 3/2009 | Ferlitsch et al. | |
| 2009/0113138 | A1 | 4/2009 | Bass et al. | |
| 2010/0106990 | A1 | 4/2010 | Kalman | |
| 2010/0313044 | A1 * | 12/2010 | Rajpal et al. | 713/320 |

FOREIGN PATENT DOCUMENTS

JP 2009-157571 7/2009

OTHER PUBLICATIONS

Cooper et al., "Bidding for storage space in a peer-to peer data presevation system", 2002, IEEE.*
International Search Report in corresponding PCT Application No. PCT/US2010/042478 mailed Feb. 23, 2011.
Written Opinion in corresponding PCT Application No. PCT/US2010/042478 mailed Feb. 23, 2011.

* cited by examiner

*Primary Examiner* — Thomas Lee
*Assistant Examiner* — Xuxing Chen
(74) *Attorney, Agent, or Firm* — Beyer Law Group LLP (57) ABSTRACT

Each node and volume in a storage cluster makes a decision whether to reduce power consumption based on lack of requests from client applications and nodes over a time period. Node configuration parameters determine how long to wait until idling a node or volume, and how long to wait while idle before performing integrity checks. A bid value is calculated by each node and reflects how much it will cost for that node to write a file, read a file, or keep a copy. A node with the lowest bid wins, and nodes that are idle have a premium added to each bid to ensure that idle nodes are kept idle. In an archive mode, writes bids are reversed, nodes with less capacity submit lower bids, fuller nodes fill up faster and are then idled, while empty or near empty nodes may remain idle before winning a write bid.

10 Claims, 6 Drawing Sheets

METHOD FOR PROCESSING A REQUEST BY SELECTING AN APPROPRIATE COMPUTER NODE IN A PLURALITY OF COMPUTER NODES IN A STORAGE CLUSTER BASED ON THE LEAST SUBMITTED BID VALUE

CROSS-REFERENCE TO RELATED APPLICATIONS

This application is a divisional of U.S. patent application Ser. No. 12/839,071, filed Jul. 19, 2010 entitled "Adaptive Power Conservation in Storage Clusters," which in turn claims priority of U.S. provisional patent application No. 61/226,774 filed Jul. 20, 2009 entitled "Adaptive Power Conservation," both of which are hereby incorporated by reference.

FIELD OF THE INVENTION

The present invention relates generally to power conservation. More specifically, the present invention relates to power conservation in storage clusters.

BACKGROUND OF THE INVENTION

Currently, general efforts are underway to reduce electricity consumption by computers in order to promote so-called "green" technologies and to address global climate change. But, in addition to these long-term goals, reduced power consumption can provide an immediate savings to the business owner. Not only will a reduction in power used by a computer system mean a lower electric bill for the computer system itself, but also a reduction power will mean lower cooling costs for the computer system. For enterprises managing enormous data centers, a reduction in the power needed to cool racks of computers can be very significant. For these enterprises, a reduction in cooling capacity also means less cooling infrastructure needed and less real estate needed for the data center.

Accordingly, it is generally desirable to conserve power in a computer storage cluster in order to save money and reduce the cooling necessary. But, in a storage cluster in which client applications are constantly writing to the cluster and reading from it, and in which the storage cluster itself is assessing its own digital object integrity and making necessary copies of digital objects, it can be challenging to devise a power conservation scheme.

Therefore, a technique and system are desired that will reduce power consumption in a computer storage cluster while still allowing client applications the necessary access and will uphold object integrity within the cluster.

SUMMARY OF THE INVENTION

To achieve the foregoing, and in accordance with the purpose of the present invention, a power conserving technique is disclosed. It is realized that it would be advantageous for a storage cluster to conserve power by spinning down disk drives when volumes are not in use and by reducing CPU utilization when nodes are not in use.

The present invention presents mechanisms by which an under-utilized cluster can begin to spin down disks and reduce node CPU utilization. The goal is not to deliberately reduce available throughput in order to conserve power, but rather to recognize when throughput demands are low and take action to conserve power. A cluster that is dormant at night or on weekends, or one that is infrequently used for write/read/delete operations will enjoy significant reduction of power usage during dormant periods—perhaps as much as 80 to 90%. Subsequent access of the cluster will automatically waken one or more nodes to carry out requests and eventually may revive the entire cluster. The maximum available throughput will not be affected, although additional latency will be incurred on the first access to a sleeping node.

Advantages of this approach include: the invention can adjust to widely varied usage patterns by client applications; each node and volume makes its own decentralized decisions about when to sleep and wake; and the entire cluster may be completely dormant. The invention does not require administrators to design more complicated subcluster arrangements to accommodate power conservation; and, there is essentially zero administrative overhead.

A first embodiment of the invention allows computer nodes and their hard disks in a storage cluster to be each independently idled, thus conserving power. A second embodiment allows read or write access to relevant nodes in a storage cluster while the entire cluster is idled, without requiring the entire cluster to be wakened. A third embodiment utilizes an archive mode for archive applications in which certain nodes remain idle and empty until needed. A fourth embodiment allows health processing of the entire cluster to occur after a predetermined time when the cluster has been idle. A fifth embodiment utilizes solid-state drives (SSDs) to eliminate initial latency of an idle cluster due to spin up delays.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Block Diagram

The present invention may be implemented using any suitable computer hardware and software. A storage cluster may include any number of computer nodes. Preferably, each node includes a CPU (or multiple CPUs), an operating system, communication links to the other nodes (or, to at least a central router), and any number of internal hard disk drives or solid-state drives (i.e., from zero to N). Typically, each node includes at least one drive and there may be any combination of hard disk drives along with solid-state drives. A cluster is typically a fixed-content storage cluster, meaning that it is used for backups, long-term storage, archiving, etc., and is not typically used for day-to-day access to computer files. Often referred to as WORM (write once, read many) storage, this means that once a computer file or digital object is written to the cluster it cannot be changed. (Of course, a modified version of the computer file may also be stored within the cluster.) A cluster may be implemented as a redundant array of independent nodes (a RAIN) meaning that each node runs its own operating system and makes independent decisions about storage within the cluster. Storage clusters may be built upon blades, towers, personal computers and servers. Alternatively, a multi-core processor within a single computer box may support a virtual storage node running on each core, meaning that a storage cluster having multiple nodes may be present within the single computer box. Further, a computer system inside a single physical box may include multiple CPUs in which case each CPU may represent a node and the storage cluster may be implemented within the single physical box.

Figure 1:
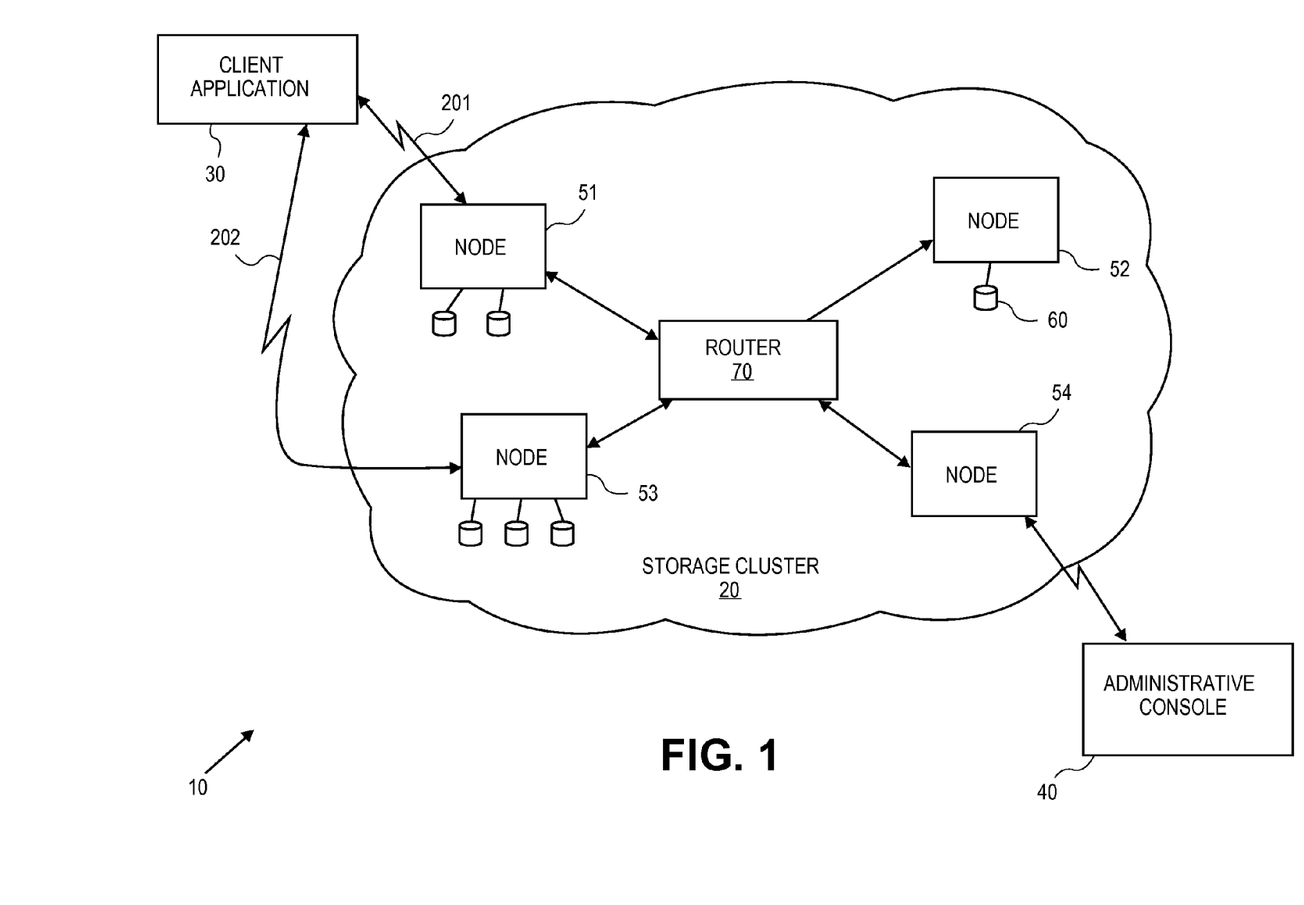
FIG. 1 illustrates an environment for operation of the present invention.

FIG. 1 illustrates an environment 10 for operation of the present invention. Included is a storage cluster 20, a client application 30, an administrative console 40, any number of computer nodes 51-54, and a central router 70. As mentioned above, a computer node is a physical file server that preferably includes at least one CPU and any number of disk drives, solid-state drives or hybrid drives that have both types. Each node implements an operating system such as Debian Linux and executes processes to manage peer-to-peer communications between nodes, to perform health processing, and to make independent decisions on behalf of the node and its volumes. Each node also includes administrative software and its status can be viewed via a web browser over the Internet.

In one particular RAIN embodiment, each node is a 1U server (e.g., an x86 computer) with 1 terabyte or more of serial ATA disk storage capacity with standard Ethernet networking. Each node has an IP address and may be physically interconnected using an IP-based LAN, MAN or WAN. Thus, each node may talk to a single node or may broadcast a message to all nodes within the storage cluster (a multicast) using a router 70 or other similar network switch.

Each node includes a management module for handling external requests from client applications (e.g., SCSP requests), replication requests between nodes (e.g., inter-SCSP requests), and other internode protocol communications (bidding, requests for information, etc.). A health processing module (described below) manages the digital content of each node. The administrative console 40 is preferably a Web server linked to the storage cluster that allows access to each node over any suitable Internet connection. Each node implements a redundant administrative console which can be used to view and administer the entire cluster.

In one embodiment, a storage cluster is implemented using the CAStor content storage software available from Caringo, Inc. of Austin, Tex., and any suitable computer hardware. In this embodiment, a storage cluster is fixed-content storage and each digital object is uniquely addressed within the cluster by a random number (a universally unique identifier, or UUID) that has been generated for that digital object using a truly random number generator. The contents of each digital object are verified using a hash function. A client software application receives the UUID when storing a digital object in the cluster and retrieves that digital object by supplying the UUID to the cluster. Software applications communicate with a CAStor cluster using standard HTTP 1.1, and more specifically, using a simplified subset of the standard called Simple Content Storage Protocol (SCSP). Using this standard interface, client applications such as electronic mail, enterprise content management, health care applications, web browsers, Web 2.0 sites, photo sharing, social media sites, security video, video editing, etc., may access the CAStor storage cluster. Further, direct HTPP access is available for browsers, JAVA, Python, C++, and other software environments.

Overview

The invention allows each node and volume in the cluster to make an independent decision about whether to reduce its power consumption based on the frequency of requests from external client applications and replication requests between nodes that it has actually serviced over a configurable time period. Two node configuration parameters called sleepAfter and wakeAfter are used, both of which are, for example, an integer numbers of seconds (these need not have the same value for all nodes in the cluster).

If a node has not serviced a request from a client application (read or write) nor a similar request from another node in the last sleepAfter seconds, it will begin to rest. If there continue to be no outside demands to read or write (as would be expected at night and on weekends, for example) eventually the node and all its volumes will become completely dormant. When a client application once again begins sending requests, one or more of the nodes in the cluster will awake to service those requests. Even if no outside activity is detected for a long while, each node will awake after it has been idle for wakeAfter seconds so that it can perform its health processing housekeeping periodically (making sure that at least the minimum number of specified copies of the digital object exist within the cluster).

A bidding process is used by which each node calculates a bid value that reflects how much it will cost for that node to write a digital object, read a digital object or replicate a digital object (cost to keep a copy on that node). Generally, a node bids for these write, read and replicate requests by submitting a bid to the primary access node that is requesting bids from all available nodes. A bid is a numerical value and the lower the bid, the better the chance that the node will win the chance to service the request. Writing is the process of taking a digital object from a client application and storing it on a disk in a node of the cluster. Reading is the process of accepting a unique identifier for a digital object from a client application, finding the digital object on a disk in the cluster, and then returning that object to the client application. Replication requests determine the cost to store a copy of the digital object on a node within the cluster (assuming that replication factor is equal to 2, two copies are required in the cluster). Results of bids after replication requests may involve copying and storing another copy of an object. In order to conserve power in the cluster, bidding takes into account whether or not a node is idle, the capacity of a node, how busy it has been in the past few minutes, which types of disk drives are available, and their current states.

The node with the lowest bid wins the opportunity to write, read or replicate. The replication bid reflects the cost to keep a copy of a digital object where it is. Health processing will use the replication bid to decide whether or not to move a copy to a different node. Basically, health processing asks each node: do you have a copy of this digital object and what is the cost to keep it there? Each node responds by calculating its replication bid and providing it to the health processing module.

An idle node reduces its power consumption by pausing its health processing and changing its bidding (as described below) so that it prefers not to read, write, or replicate streams to another node. Its operating system will notice the reduced utilization and will ratchet down the CPU clock rate and power consumption accordingly. Running a processor at high clock speeds allows for better performance. However, when the same processor is run at a lower frequency (speed), it generates less heat and consumes less power. In many cases, the core voltage can also be reduced, further reducing power consumption and heat generation. This can conserve battery power in storage servers, extend processor life, and reduce noise generated by variable-speed fans. Most Intel chip sets have SpeedStep® technology to automatically reduce the CPU clock speeds when the processor has less work to do. A similar technology from AMD, called PowerNow!® accomplishes the same purpose for that company's chip sets.

An idle volume reduces its power consumption chiefly by eliminating disk I/O and spinning down its disk. When a node becomes idle, some or all its volumes might still be active and working on backlogged tasks for the node. A volume transitions to the Idle state and spins down its disk only when it has had no I/O activity in the past sleepAfter seconds.

Detailed Design

Four cluster-wide configuration parameters are used: sleepAfter, the number of seconds of inactivity before an active node or volume becomes idle (default is 2 hours); wakeAfter, the number of seconds of inactivity before an idle node becomes active again (default is 8 hours); idleCost, a bid premium added to read and write bids for idle nodes (default is 10); and, replication factor, the number of copies of each digital object that must be maintained within the storage cluster (default is 2, but each object may contain metadata that trumps this parameter). These parameters are stored in a cluster configuration file that is sent to each node at boot time.

An archive mode setting is provided for each node for those applications implementing archiving. This setting (typically a binary value) reverses the normal write bid values for all volumes on a node by subtracting the write bid value from 100 in order to obtain a new write bid value. When used, this setting modifies how a node bids for writes, trying to keep the node asleep for as long as possible. True archive applications do not have particularly high requirements for write and read throughput, especially compared to the aggregate throughput capacity of very large clusters. The normal bidding algorithms for calculating write bids and replication bids attempt to load balance uniformly across all nodes in the cluster in order to maximize throughput, but this balancing has the unwanted side effect of depriving nodes of sleep. Cluster administrators may choose to designate some or all nodes to be in archive mode. Typically, a core set of nodes large enough to handle peak throughput demands will be non-archival. New nodes added solely to increase capacity can be designated archive nodes and they will sleep until needed.

For such applications, the archive mode setting essentially reverses the normal bidding patterns of all volumes on a node for write requests. Volumes that are empty or nearly so will prefer not to write streams, while volumes that are fuller voraciously seek to store more and more data until just before they reach capacity. A node will attempt to fill up its volumes that are nearly full before asking other, more empty, volumes to become active. The result is that a new, relatively empty node will not win any write bids, will not service client application write requests and will continue to sleep, which is desirable in an archive application. Given the power conservation mechanisms described in this disclosure, and assuming this type of archival reverse bidding, we expect new nodes or volumes added to the cluster to remain idle in low-power mode until their capacity is actually needed. Older nodes and volumes will continue to be used until they become nearly full, at which time they too will begin to slumber.

In order to conserve power, each node can be transitioned to an Idle state. If a node detects no client application requests or similar requests from other nodes to read or write in the last sleepAfter seconds, it will enter an Idle state in which it begins to reduce its CPU utilization and change its bidding practices to conserve power. The former is accomplished simply by pausing the node's health processing module while in the Idle state. A reduction in CPU utilization will cause the operating system and the CPU itself to conserve power by automatically ratcheting down the clock speed of the CPU and RAM, using less power, generating less heat, and enabling the cooling fans to also run slower and use less power.

As mentioned above, nodes use bids to compete against other nodes. The bidding changes described below are intended to make it less likely that the idle node will win future bids for reads, writes, deletes and replications requiring a file to be moved from an idle node (i.e., actions requiring disk access). If other nodes in the cluster are still awake, they will more likely handle these requests, allowing the idle node to remain asleep. Note that idle nodes still respond to internode protocol messages and may also continue working on backlog work such as already queued replication requests and requests from their own health processors to read and examine objects for integrity.

An idle node is idle in the sense that its health processing is paused and its bidding is "lazy." It will continue to act as a Primary Access Node (PAN) if called on to do so, and it will continue to respond to internode protocol queries from other nodes, all of which are answered using only in-memory structures (rather than accessing a disk). Servicing an external request as a PAN will not awake a sleeping node (transition to an active state), unless that node actually wins the bid. While a node is in the Idle state, it will modify its normal internode bidding for writes, reads (including deletes), and replication as follows: writeBid—calculate as usual, then add idleCost; readBid—calculate as usual, then add idleCost; RepBid—calculate as usual, then subtract idleCost. I.e., it is cheaper to keep an existing replica in place on an idle node than to move it from an idle node.

In summary, it will be more expensive to read or write to an idle node, and less expensive to keep existing replicas there. Note that health processing uses the writeBid to decide whether to move a replica onto the idle node and repBid to decide whether to move one off of the idle node. The reason to modify the bids (rather than simply not bidding for reads and writes) is to avoid choke points caused by some nodes sleeping while others remain awake and servicing requests. While this may happen for some period of time, eventually the bids returned by the waking nodes will exceed those from the sleeping ones, even with the idle premium factored in.

Idle nodes will still engage in internode protocol communications and may still have busy volumes. In the absence of external client application requests, internal replication activity and health processing iteration, the idle node will continue to service certain requests from other nodes. If some of the other nodes are still active, there are a number of internode messages that require access to disk volumes in order to respond. These include: trimRequest—sent by another node when there are too many replicas; deleteQuery—sent after another node has deleted a stream in response to a dynamic delete; versionQuery—sent by another node to inquire about the version number of an anchor stream; and versionNotice—sent by another node when it determines there is a stale mutable object. Because these internode requests will need to be serviced, an idle node will generally not be able to spin down all its volumes immediately. Eventually, most or all the other nodes in the cluster will also become idle and the internode activity will fall off and ultimately cease altogether. When that happens, the volumes of an idle node will begin to go idle themselves.

Each volume of a node also has an Idle state. An individual volume will decide independently when it should spin down its disk. It does this using the same criteria and parameters used by the node as a whole. Once a volume notices there has been no disk activity on its in-order queue for sleepAfter seconds, it will transition into a volume Idle state and spin down its disk. Unlike nodes, volumes do not need to wake every wakeAfter seconds because the node itself will awake and begin iterating over its volumes, automatically causing the disks to spin back up again. Solid-state drives do not physically spin down or spin up, but may still accept and handle "spin down" and "spin up" commands as part of transitioning into or from an Idle state (e.g., the drives may merely acknowledge the command).

An administrative console connected to one of the nodes displays cluster status. The administrative console also displays the Idle node and Idle volume states. Unlike other node states that are essentially derived from the combined states of its volumes, the Idle state is independent for nodes and volumes. In other words, it is possible for a node to be idle while all its volumes are active. It may also be possible, for short periods of time, for an active node to have idle volumes. In addition to reflecting Idle status, the administrative console supports modifying cluster-wide settings for the sleepAfter and wakeAfter parameters from a settings window on the cluster status page at run time. The first read or write request processed by a completely idle storage cluster may experience abnormally long latency while one or more of the volumes wakes and spins up its hard disk. Subsequent operations will likely return to the now spinning volume, as explained above, so this additional latency only occurs on the first request.

Solid-state drives (SSDs) can be utilized to reduce or eliminate this added latency, since they are already power efficient compared to rotating media and their latency when idle is essentially the same as when active, i.e., they do not physically spin down. However, SSDs are typically more expensive and have smaller capacities compared to conventional disk drives. To model these different characteristics, SSDs may calculate their bids differently from ordinary drives. SSDs will generally have lower writeBids and readBids, reflecting their higher throughput rates, and higher repBids, reflecting their smaller capacities and higher costs. In other words, SSDs will prefer to store new data initially, but to replicate it to other, lower cost media as soon as possible. The bid from an SSD (along with bids from other drives of the node) will be taken into account by its node when the bid value for the entire node is calculated.

Importantly, SSDs will not adjust their bids when in idle mode the way conventional volumes do. Because of this behavior, SSD volumes in an idle cluster will most likely win the bid for any write or read for data they store. The overall effect is that an idle cluster containing SSDs will respond to requests with very low latency—compared to idle clusters without SSDs—without negatively impacting power savings characteristics.

Health Processing

As mentioned above, a health processing module of each node iterates over the digital objects of the node in order to ensure the integrity of all digital content, to ensure that the proper number of copies of each digital object exist within the storage cluster, and to move objects to a cheaper node in order to preserve throughput. When a digital object is first written to the storage cluster by a client application, a hash value for this object is calculated and stored in a memory location accessible to software managing the storage cluster, for example, accessible to the health processing module. Any suitable hash function may be used, for example, the MD5 algorithm is well suited for this purpose. Note that this unique hash value serves to confirm the integrity of each digital object and is not necessarily the same as the universally unique identifier used to locate the digital object. In a preferred embodiment, the MD5 used for integrity purposes is different from the universally unique identifier. The default state of each node in the cluster is to perform integrity checking, assuming that no writes or reads are in progress ("Posts" or "Gets"). The health processing module of each node then walks through all digital content of the node verifying that the originally-stored MD5 of each digital object is equivalent to a freshly-calculated MD5 for that digital object.

In order to ensure that the proper number of copies of each digital object exist within the storage cluster, the health processing module uses multicasting. In one embodiment, whenever a file is touched during an integrity check, the health processing module sends a message to all other nodes asking: do you have this digital object and what is your cost to continue storing it? The response to this multicast message will indicate if any more copies of a particular file are needed within the storage cluster and will also indicate the cost to continue storing such a copy on each node (the replication bid).

Even if enough copies of the digital object exist within the storage cluster (determined by the cluster parameter replication factor, as modified by any metadata of the digital object itself), a health processing module may decide to move an object to a cheaper node. While this movement may help ensure high throughput (the data is spread around and more nodes are active), it is not necessarily the best for an archive application. An archive application conserves power better with just a few nodes active and storing data. Once these few nodes are full, they can become dormant, thus saving power. The archive mode parameter above may be used in a situation.

Detailed Flow Diagrams

Figure 2:
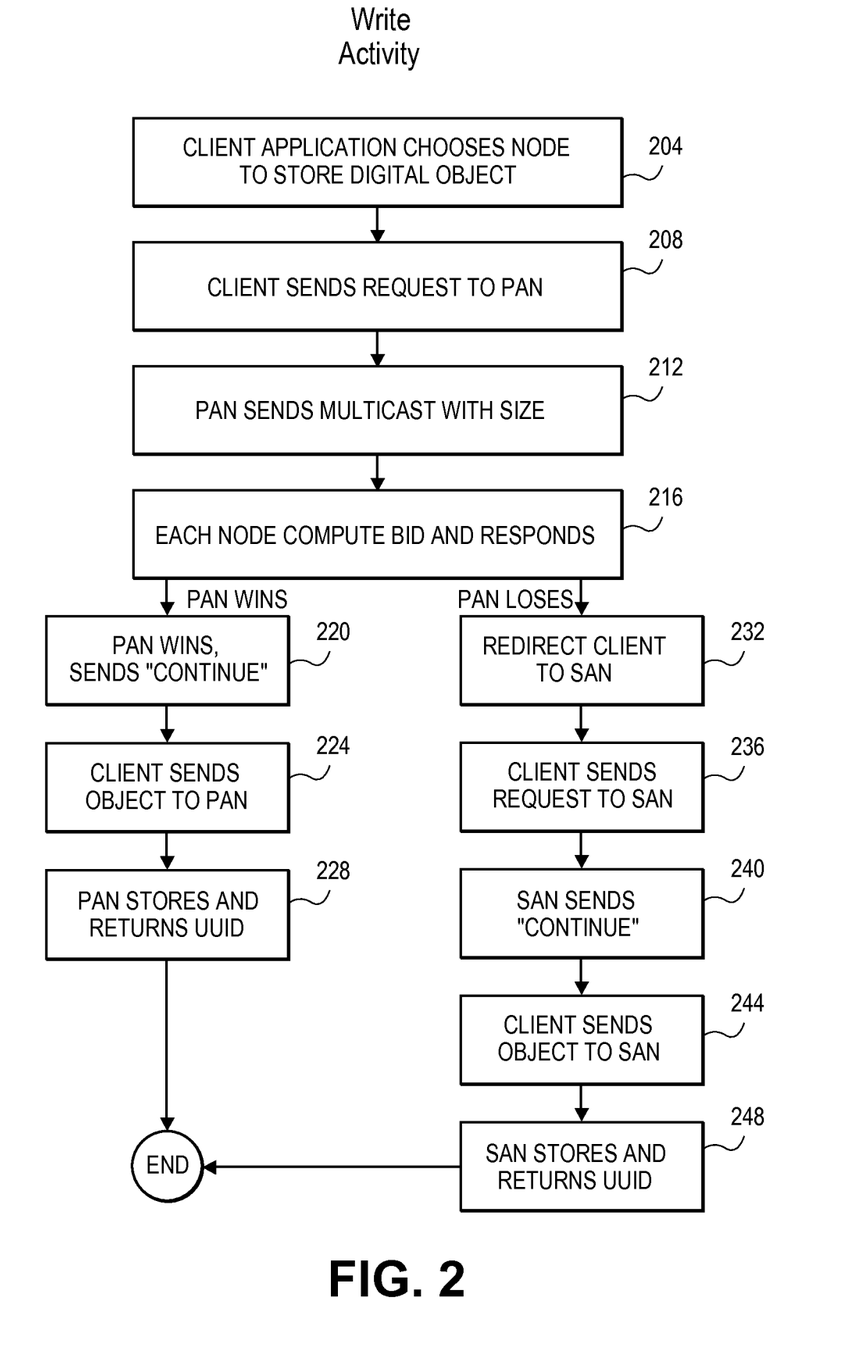
FIG. 2 is a flow diagram describing how a client application writes a file to the storage cluster in normal operation.

FIG. 2 is a flow diagram describing how a client application writes a file to the storage cluster in normal operation. In step 204 any suitable client application 30 desires to store a digital object (such as any computer file, digital image, digital movie, health record, etc.) in the storage cluster 20. The client application discovers or obtains an IP address of one of the nodes 51 within the cluster and chooses that node as the primary access node (PAN) with which to begin the storage process. Typically, a client application will access the last node used for its next request to write. In step 208 the client application sends a request 201 to the PAN to store the digital object. In one embodiment, this request is an HTTP POST request that includes a header and the length in bytes of the digital object. The response to this request from the PAN to the client will be one of: yes, the PAN can store the object; no, here is a better node to store the object; or no, no node within this cluster can store that object.

In step 212 the PAN receives this request and response by sending a multicast message to all nodes within the cluster indicating a digital object to be stored and its size in bytes in order to determine which node will be used to store the object. In step 216 each node (including the PAN) computes a write bid for this digital object and returns this bid value to the PAN.

The write bid value reflects the cost to store the digital object on each node and is currently implemented as a value from zero to 100. A lower bid means that it is less expensive to store the object on that node and it is more likely that the node will win the bid. Factors used to calculate a write bid value for the node include: how full the node is, the size of the digital object, whether or not the node is active or idle, how busy the node has been recently, which type of volumes are available (solid-state drives disk drives, etc.) and their individual bids, and the states of the volumes (retiring, idle, etc.). In other words, a node's bid is derived from the individual bids of each of its volumes. The node calculates the storage cost for each volume, takes the lowest (best) value, and then uses that to calculate its own node-level bid as described above. A node may have many drives that have different bids because they have different capacities, or they are in different states, etc.

The PAN then chooses the node with the lowest bid value and control moves either to step 220 or to step 232. In step 220 the PAN has the lowest bid and it responds by sending a "continue" message back to the client application. In response, the client sends the digital object to the PAN in step 224 and in step 228 the PAN stores the digital object, calculates a universally unique identifier and returns this identifier to the client application.

On the other hand, if the PAN loses the bid, then in step 232 the PAN redirects 202 the client application to the node 53 with the lowest bid that will then handle the request, that is, the secondary access node (SAN). In step 236 the client application then sends the same request to the SAN (as in step 208) and the node responds in step 240 by sending a "continue" message back to the client application. In response, the client sends the digital object to the SAN in step 244 and in step 248 the SAN stores the digital object, calculates a universally unique identifier and returns this identifier to the client application.

In a similar fashion, a client application may make a request of the storage cluster to return a particular digital object identified by a UUID. This may be implemented using a SCSP GET request. The client application supplies the identifier to a PAN of the storage cluster, a multicast message is sent along with the identifier to all nodes within the cluster, each node calculates a read bid (the cost to read and return the digital object to the client application), the PAN chooses the node with the lowest read bid, and that node then returns the digital object to the client application. Of course, nodes that do not store the digital object (as determined by the existence of the object's unique identifier within memory of the node) would not bid. While any node may implement a POST request and write a digital object to one of its drives, only a node that actually stores the digital object can respond to a GET request from a client application. Nodes may also perform internode write and read requests (for purposes of replication during health processing) in a similar manner as described above.

Therefore, it is realized that certain activities make a node "busy" and place it into an active state. A node is busy (and therefore not in the Idle state) if: it is responding to an external client request such as writing a file or retrieving a file; or if it is responding to another node's request to write or read a file (perhaps as part of health processing). In order to conserve power, the following technique transitions a node from the active state to the Idle state.

Figure 3:
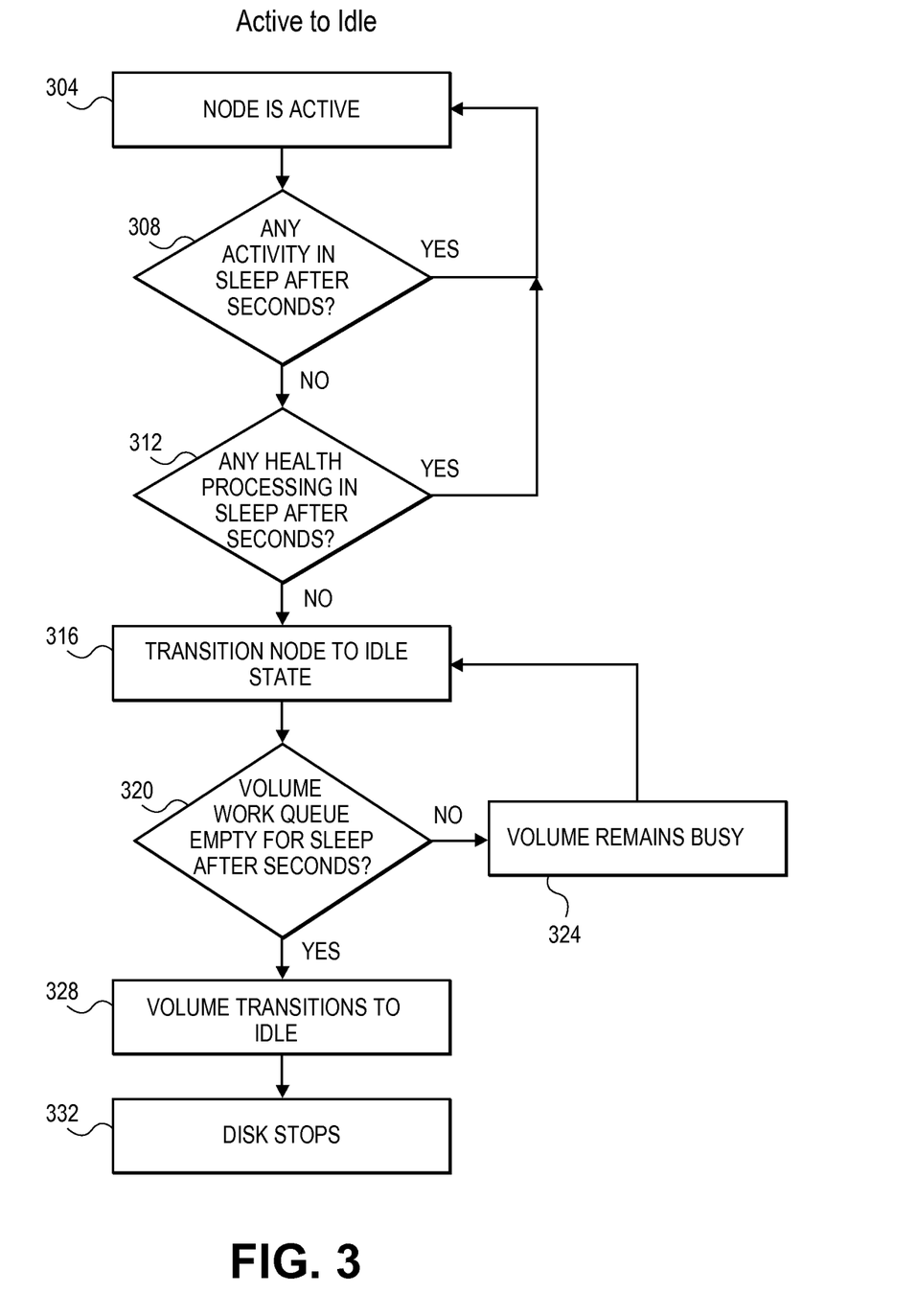
FIG. 3 is a flow diagram describing how a node transitions from an active state to the Idle state.

FIG. 3 is a flow diagram describing how a node transitions from an active state to the Idle state. This flow is performed independently by each node in the storage cluster. Initially, it is assumed that a node is busy, or active, meaning that it is performing writes, reads, and health processing activities (checking the integrity of each file stored at the node, determining if the proper number of copies of a file exist in the cluster, and moving files to cheaper nodes). Of course, if a file is found corrupted then it should be deleted and an additional copy stored within the cluster. Likewise, if health processing determines that the proper number of copies are not found within the cluster, then an additional copy also needs to be stored. Health processing may also write a file to another node (even if enough copies exist) if a cheaper node can be found. All these activities are CPU intensive and can involve disk access. An active node then, is responding to read and write requests from client applications or from other nodes.

Accordingly, in step 304, the node is currently active because of any of these activities. Steps 308 and 312 are preferably performed in parallel and test whether there has been any writing or reading activity or any health processing involving writing to disk for a predetermined length of time. With regard to health processing activities, it is noted that some activities may not involve writing a file to disk. For example, if integrity checking does not find any corrupt objects then no additional copies need be written. Likewise, if the proper number of copies exist in the cluster then an additional copy does not need to be written. Finally, if health processing does not find a cheaper node, then a copy of a file need not be moved. Health processing activities involving writing to disk would hold up transitioning the node to an idle state, while activities not involving writing would not hold up this transition.

As mentioned, the parameter sleepAfter may be set to the desired length of time. If there has been any activity then the node remains active. But, if after the predetermined length of time there have been no reading or writing activity nor any health processing activity involving writing then the node transitions to an Idle state in step 316.

Transitioning the node to an Idle state may be performed in different manners. Preferably, the transition involves stopping all health processing activities so that very few active processes remain. Once the operating system notices that there is no (or very little) CPU activity, the operating system will reduce the clock speed on the CPU and RAM. One advantage of power conservation within a storage cluster is that aside from external client application requests, health processing activities, and handling of multicast messages in the cluster, there are few if any other active processes. Once the node transitions to an Idle state and all health processing ceases, it is more likely that the operating system will reduce the clock speed because very few processes remain On a normal computer there are a large number of processes always running which reduces the likelihood that the operating system will reduce the clock speed. Once in an Idle state, the node bids in a "lazy" fashion reducing the chances that it will be called upon to perform a read, write or replication. At this point the node is idle but any of its volumes may still be processing backlogs of work in on their work queues. Each volume maintains its own work queue.

Once it is determined that the work queue for a particular volume has been empty for sleepAfter seconds in step 320 (i.e., the disk has nothing to do) then in step 328 this volume transitions to an Idle state as well. If the work queue for the volume is not empty then the volume is still busy in step 324, but the node will remain idle. The volume transitions to an Idle state by spinning down the disk using any suitable command. For example, one method of controlling disk spin down is through the hdparm utility that is installed in an embedded Linux operating system. The command line options of interest are S, y, C, Y and Z. Option "S" sets the standby (spin down) timeout for the drive. This value is used by the drive to determine how long to wait (with no disk activity) before turning off the spindle motor to save power. The test in step 320 may be performed using the operating system or in hardware. Finally, once the disk has been spun down it stops in step 332 thus further reducing power consumption.

Figure 4:
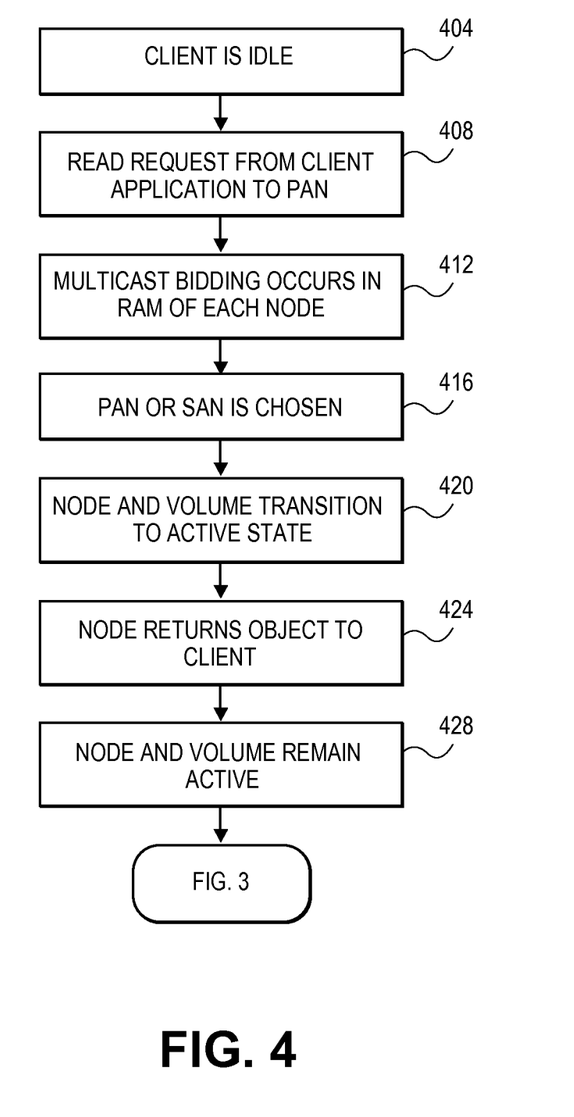
FIG. 4 is a flow diagram describing how an idle cluster handles a read request.

FIG. 4 is a flow diagram describing how an idle cluster handles a read request. In step 404 it is assumed that the entire storage cluster is idle, that is, each computer node of the cluster is in an Idle state. Additionally, all health processing activity has ceased.

In step 408 an external read request is received from a client application at a primary access node (PAN) requesting a particular digital object identified by a unique identifier. In step 412 the PAN commences the multicast bidding process. Each eligible node calculates its own read bid and returns this value to the PAN. Calculation of the bid value occurs using the CPU and RAM of each node and no disk access is necessary, thus conserving power. A node will only bid if one of its volumes actually stores the digital object required; a node makes this determination if the unique identifier is stored in the memory of the node. Factors used to calculate a read bid value for the node include: whether or not the node is active or idle, how busy the node has been recently, which type of volumes store the object and their individual bids, and the states of the volumes (retiring, idle, etc.). As explained above, an Idle Cost value is added to the bid if the node is idle. This additional value helps nodes that are idle remain idle. If all nodes are idle, then one node will need to be awakened to perform the request.

In step 416 the PAN chooses one of the responding nodes based upon the lowest bid; at this time, the chosen node (and all other nodes) are still in the Idle state. In step 420 the chosen node transitions from the Idle state to the active state and its volume that stores the digital object also transitions to the active state. Transitioning to the active state for nodes and volumes involves first spinning up the volume containing the digital object. The health processor for newly active nodes will not begin until the read is completed.

In step 424 the active node then implements the GET request and returns the identified digital object to the client application. At this point, in step 428 the chosen node and the volume remain in an active state and health processing may again occur. Next, the node begins to implement the flow diagram of FIG. 3 whereby the node may eventually transition back to an Idle state.

Figure 5:
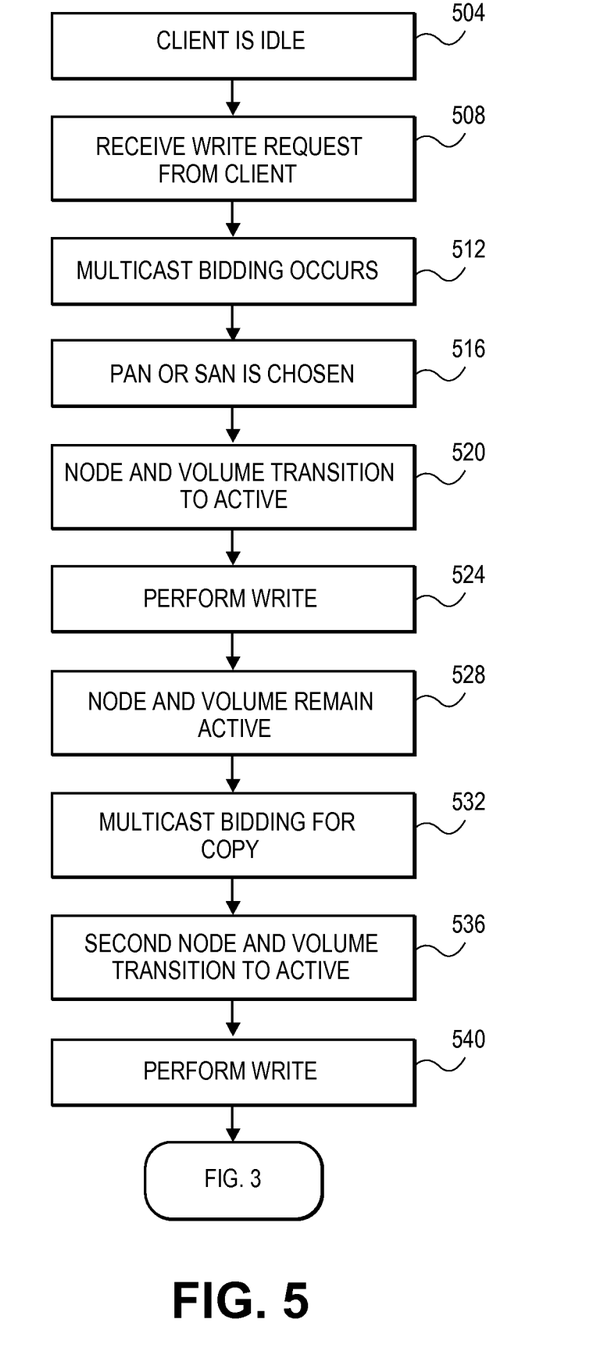
FIG. 5 is a flow diagram describing how an idle cluster handles a write request.

FIG. 5 is a flow diagram describing how an idle cluster handles a write request. In step 504 it is assumed that the entire storage cluster is idle, that is, each computer node of the cluster is in an Idle state. Additionally, all health processing activity has ceased.

In step 508 an external write request is received from a client application at a primary access node (PAN) requesting that a particular digital object be written to the storage cluster. In step 512 the PAN commences the multicast bidding process. Each node of the cluster calculates its own write bid (e.g., as described above) and returns this value to the PAN. Calculation of the bid value occurs using the CPU and RAM of each node and no disk access is necessary, thus conserving power. As explained above, an IdleCost value is added to the bid if the node is idle. This additional value helps nodes that are idle remain idle. As mentioned above, the winning bid will mainly be determined by the utilization of the node and its volumes. Volumes that have more available storage capacity are more likely to win the bid, as are nodes that have more unused memory.

In step 516 the PAN chooses one of the nodes based upon the lowest write bid; at this time, the chosen node (and all other nodes) are still in the Idle state. In step 520 the chosen node transitions from the Idle state to the Active state and its least full volume also transitions to the active state. The chosen volume will spin up its disk.

In step 524 the active node then implements the POST request and writes the digital object to the least full volume, calculates a unique identifier for the digital object, and returns the identifier to the client application. At this point, in step 528 the chosen node and the volume remain in an active state and health processing may again occur. Because at least two copies of the digital object will typically be required within the storage cluster, at step 532 the Secondary Access Node (SAN) again sends a multicast message to commence the bidding process once again for the opportunity to write a copy of the digital object. In step 536, once a node (the replication peer) wins this bid, the node and its least full volume transition to the active state. Writing of the second copy of the object to this other node is then performed in step 540. Of course, if the replication factor for the storage cluster has a value greater than two, then more copies of the digital object would be written at this time. Next, both nodes begin to implement the flow diagram of FIG. 3 whereby each of these nodes may eventually transition back to an Idle state.

Thus, FIGS. 4 and 5 illustrate how a sleeping cluster may implement write and read requests from client applications without needing to awaken every node within the cluster.

EXAMPLE

Assume sleepAfter is 30 minutes and wakeAfter is 8 hours. On Friday afternoon at 5:30 p.m. everybody goes home for the weekend and an otherwise busy storage cluster finds itself with no new work to do. All nodes will continue to iterate over their content, performing health processing checks and catching up with necessary replications until all streams in the cluster are healthy and fully replicated. When that state is reached, all replication activity has ceased, although nodes may still be busy iterating and checking, using CPU cycles and accessing the hard disks. At some point, one of the nodes notices it has had no new work to do in the last 30 minutes and it will transition to the Idle state, pausing its health processing and bidding in a "lazy" fashion (i.e., adjusting bids to not desire to read, to write or to replicate digital objects). It will continue to respond to internode protocol requests (including requests concerning number of copies) from other nodes, but these are serviced entirely out of in-memory structures and do not require disk access. The newly idled node does not send queries regarding number of copies to other nodes though, since its health processing is no longer iterating. The node's volumes will typically remain active for some time after the node becomes idle while they clear out their work queues. Eventually, the volumes will notice that their work queues have been empty for 30 minutes and they will become idle, spinning down their disks.

Other nodes will begin to realize they have no new work to do after 30 minutes and they too will become idle. Eventually, all nodes in the cluster will become idle and stop sending any internode protocol messages. The only activity in the sleeping cluster is the infrequent transmission and receipt of "town crier" messages, which helps the cluster detect failure of sleeping nodes.

Now assume that a low-frequency maintenance application needs to write one new stream (a digital object) to the cluster each hour. Since all the nodes in the cluster are idle and bidding in a lazy fashion, one of them will win the write bid and will be forced to wake up to service the request. Note that the primary access node (PAN, the node first accessed by a client application desiring to write to or read from the cluster) will not need to wake up since it does not need to access its disks to find a suitable SAN (secondary access node, the node that will actually handle the client request if the primary node cannot) to redirect the request. The reason is that nodes can perform PAN activities while Idle. Assuming replication factor=2 (the desired number of copies of each digital object within the cluster), the SAN will also need to wake up a second node to serve as its replication peer. Both nodes will remain awake for another 30 minutes at which point they will once again become idle.

If another write request (from a client application) arrives before the two waking nodes return to their slumber, one of them will almost certainly win the bid, because all other nodes are sleeping. Thus, a client application that writes once every ten minutes (for example) will find itself talking to the same two nodes each time, while the rest of the cluster continues to conserve power. If the application tries to read a digital object that is not on one of those two nodes, the cluster will still find a replica of it, wake the node that has it, and read the data. If the application begins to operate more frequently or demand more throughput, more and more nodes will awaken to handle the increased demands.

Even if there is no further application activity over the weekend, each node will awaken every 8 hours and initiate its health processing to examine its streams and perform any required corrective action. This will allow nodes to detect volumes that may have become inoperable in their sleep. If no corrective action is required for another 30 minutes, the node will return to the Idle state.

Computer System Embodiment

Figure 6A:
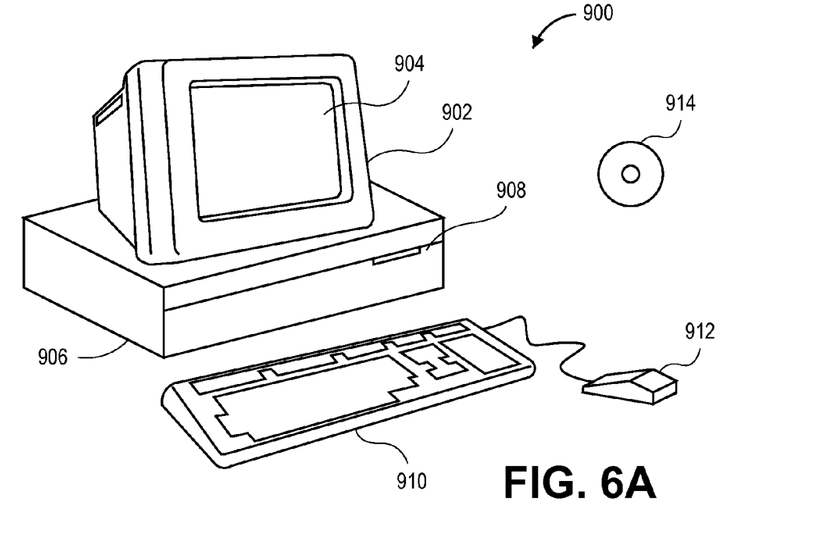
FIGS. 6A and 6B illustrate a computer system suitable for implementing embodiments of the present invention.
Figure 6B:
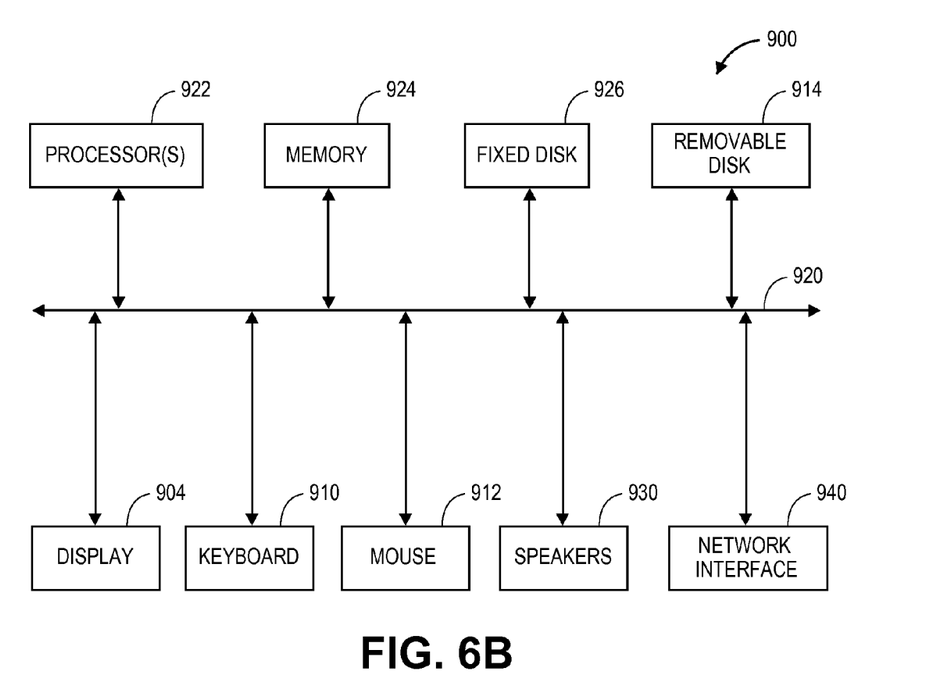

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of writing a computer file to a storage cluster having a plurality of computer nodes, said method comprising:

receiving at a first computer node of said storage cluster, a request from an external archive application to write said computer file to said storage cluster, wherein a first set of said computer nodes of said storage cluster are in an archive mode and the remaining computer nodes of said storage cluster are not in an archive mode, wherein when each of said remaining computer nodes is not in an archive mode calculated bid values from said remaining computer nodes having greater capacity are less than bid values from said remaining computer nodes having less capacity;

in response to said request, sending a multicast message from said first computer node to said computer nodes in said storage cluster requesting a bid for writing said computer file;

each of said computer nodes calculating a bid value for the opportunity to write said computer file, bid values from computer nodes in said first set having greater capacity being higher than bid values from computer nodes in said first set having less capacity;

receiving, at said first computer node, said bid values from said computer nodes;

choosing one of said plurality of computer nodes having the least bid value; and writing said computer file from said external client application to a disk volume of said chosen computer node.

2. A method as recited in claim 1 wherein said storage cluster is a write-once read-many (WORM) fixed-content stored cluster.

3. A method as recited in claim 1 further comprising:

writing said computer file to a disk volume of said chosen computer node that has the least capacity.

4. The method as recited in claim 1 wherein at least one of said computer nodes is in an archive mode and in an idle state, and wherein said computer node in an idle state includes at least one computer file of user data.

5. A method of storing a computer file in a storage cluster having a plurality of computer nodes, said method comprising:

receiving a multicast message from a first computer node in said storage cluster requesting a bid for writing said computer file, said computer file originating at an external archive application, wherein a first set of said computer nodes of said storage cluster are in an archive mode and the remaining computer nodes of said storage cluster are not in an archive mode, wherein when each of said remaining computer nodes is not in an archive mode calculated bid values from said remaining computer nodes having greater capacity are less than bid values from said remaining computer nodes having less capacity;

determining whether a second computer node in said storage cluster is in an archive mode;

when it is determined that said a second computer node is in an archive mode, calculating by said second computer node a bid value for the opportunity to write said computer file, wherein the greater capacity of said second computer node the higher said bid value;

said second computer node winning a bid competition amongst said computer nodes on the basis of said calculated bid value being a least bid value; and writing said computer file from said external client application to a disk volume of said second computer node.

6. A method as recited in claim 5 wherein said storage cluster is a write-once read-many (WORM) fixed-content stored cluster.

7. A method as recited in claimed 5 further comprising:

writing said computer file to said disk volume of said second computer node that has the least capacity.

8. A method as recited in claim 5 further comprising:

filling disk volumes of said second computer node to near capacity; and idling said second computer node when it is determined that a predetermined amount of time has passed and no requests from said external archive application have been processed.

9. The method as recited in claim 5 wherein said second computer node is in an idle state and includes at least one computer file of user data.

10. A method as recited in claim 5 wherein said second computer node receives said multicast message from said first computer node, said method further comprising:

returning said bid value from said second computer node to said first computer node; and said first computer node determining that said second computer node has won said bid competition.

* * * * *